(12) United States Patent
Kumar et al.

(10) Patent No.: US 12,586,090 B2
(45) Date of Patent: Mar. 24, 2026

(54) ENTERPRISE DATA AGGREGATION AND COLLECTIVE INSIGHTS GENERATION

(71) Applicant: Oracle International Corporation, Redwood Shores, CA (US)

(72) Inventors: Vivek Kumar, Redwood City, CA (US); Kartik Raghavan, Pleasanton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 316 days.

(21) Appl. No.: 18/168,842

(22) Filed: Feb. 14, 2023

(65) Prior Publication Data

US 2024/0273556 A1 Aug. 15, 2024

(51) Int. Cl.
*G06Q 30/02* (2023.01)
*G06N 20/00* (2019.01)
*G06Q 30/0201* (2023.01)

(52) U.S. Cl.
CPC ......... *G06Q 30/0201* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 2008/0300979 A1* | 12/2008 | Abhyanker | G06Q 30/0277 705/14.67 |
| 2015/0095106 A1* | 4/2015 | Vaidyanathan | G06Q 30/0201 705/7.29 |
| 2019/0123980 A1* | 4/2019 | Singh | H04L 43/04 |
| 2020/0012810 A1* | 1/2020 | Chavez | G06F 16/9535 |
| 2023/0067687 A1* | 3/2023 | Azarbayejani | G06Q 30/01 |
| 2024/0274291 A1* | 8/2024 | Basu | G16H 50/70 |

* cited by examiner

*Primary Examiner* — Alan Torrico-Lopez
(74) *Attorney, Agent, or Firm* — Invoke

(57) ABSTRACT

Techniques for enterprise data aggregation and collective insights generation are disclosed, including: receiving multiple sets of enterprise-specific customer relationship management (CRM) data, respectively, from enterprise-specific CRMs; aggregating the sets of enterprise-specific CRM data, to obtain collective CRM data; receiving a request to generate a collective insight that is applicable to a particular subset of the collective CRM data; responsive to the request, selecting a particular machine learning model from multiple machine learning models, wherein each machine learning model is configured to generate collective insights for a respective subset of the collective CRM data; generating the collective insight that is applicable to the particular subset of the collective CRM data, using the particular machine learning model.

18 Claims, 7 Drawing Sheets

Figure 1:
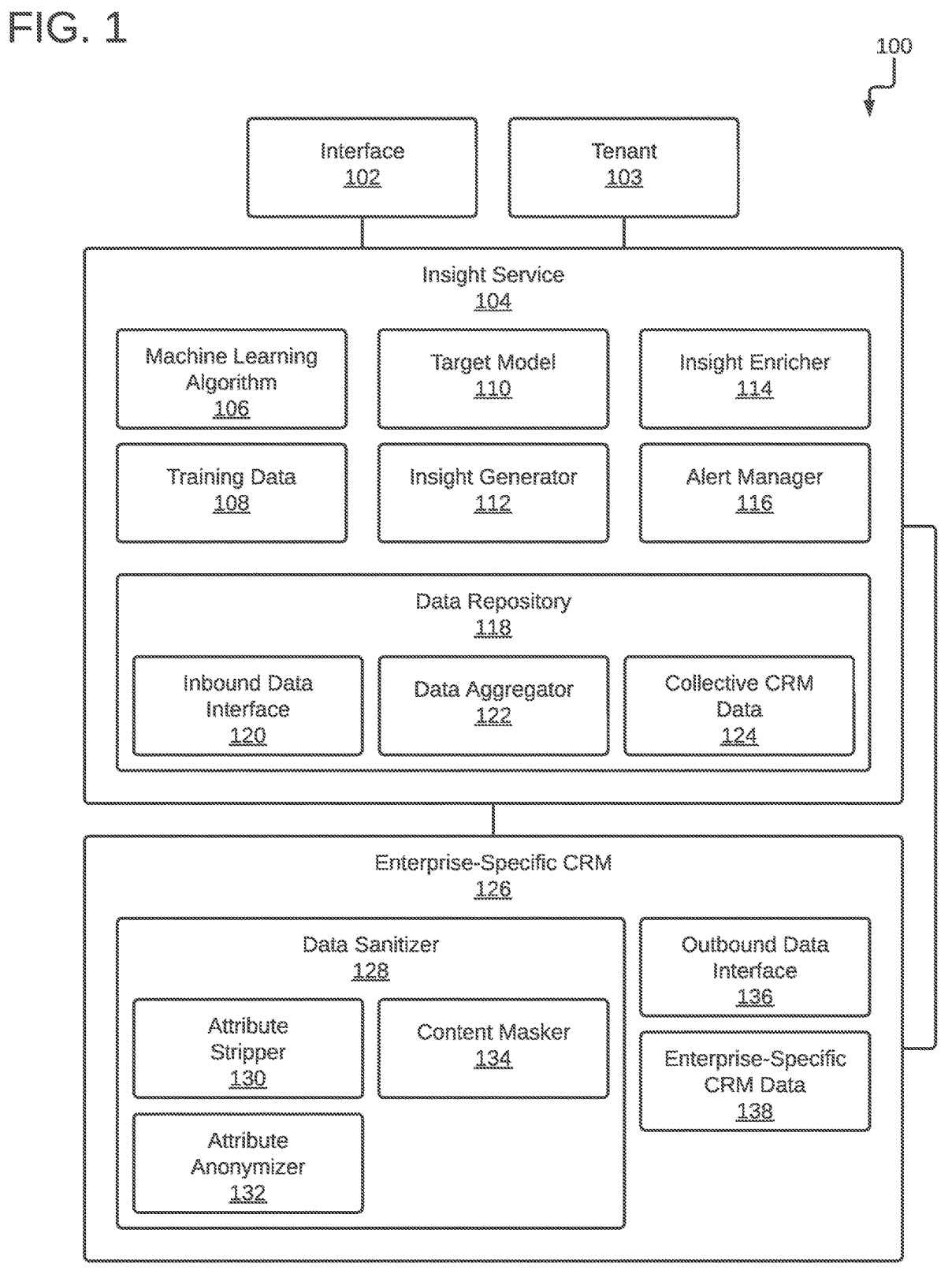

```
┌──────────────────────┐   ┌──────────────────────┐
│      Interface        │   │       Tenant          │
│        102            │   │        103            │
└──────────────────────┘   └──────────────────────┘
          │                          │
┌─────────────────────────────────────────────────────────┐
│                    Insight Service                        │
│                        104                                │
│  ┌──────────────┐  ┌──────────────┐  ┌──────────────┐   │
│  │   Machine     │  │ Target Model │  │   Insight    │   │
│  │   Learning    │  │     110      │  │   Enricher   │   │
│  │   Algorithm   │  │              │  │     114      │   │
│  │     106       │  │              │  │              │   │
│  └──────────────┘  └──────────────┘  └──────────────┘   │
│  ┌──────────────┐  ┌──────────────┐  ┌──────────────┐   │
│  │ Training Data │  │   Insight    │  │    Alert     │   │
│  │     108       │  │  Generator   │  │   Manager    │   │
│  │               │  │     112      │  │     116      │   │
│  └──────────────┘  └──────────────┘  └──────────────┘   │
│  ┌───────────────────────────────────────────────────┐  │
│  │               Data Repository                      │  │
│  │                    118                             │  │
│  │  ┌────────────┐ ┌────────────┐ ┌──────────────┐   │  │
│  │  │  Inbound   │ │    Data    │ │  Collective  │   │  │
│  │  │    Data    │ │ Aggregator │ │   CRM Data   │   │  │
│  │  │ Interface  │ │    122     │ │     124      │   │  │
│  │  │    120     │ │            │ │              │   │  │
│  │  └────────────┘ └────────────┘ └──────────────┘   │  │
│  └───────────────────────────────────────────────────┘  │
└─────────────────────────────────────────────────────────┘
                          │
┌─────────────────────────────────────────────────────────┐
│               Enterprise-Specific CRM                     │
│                       126                                 │
│  ┌─────────────────────────────────┐ ┌───────────────┐   │
│  │        Data Sanitizer            │ │   Outbound    │   │
│  │            128                   │ │     Data      │   │
│  │  ┌───────────┐ ┌──────────────┐  │ │  Interface    │   │
│  │  │ Attribute │ │   Content    │  │ │     136       │   │
│  │  │  Stripper │ │   Masker     │  │ └───────────────┘   │
│  │  │    130    │ │    134       │  │ ┌───────────────┐   │
│  │  └───────────┘ └──────────────┘  │ │  Enterprise-  │   │
│  │  ┌───────────┐                   │ │   Specific    │   │
│  │  │ Attribute │                   │ │   CRM Data    │   │
│  │  │ Anonymizer│                   │ │     138       │   │
│  │  │    132    │                   │ └───────────────┘   │
│  │  └───────────┘                   │                     │
│  └─────────────────────────────────┘                     │
└─────────────────────────────────────────────────────────┘
```

FIG. 3

Contact Data
300

| Name | DOB | Decision Maker | Job Title | ContactId | Status | Influencer | Country | Social |
|------|-----|----------------|-----------|-----------|--------|------------|---------|--------|
| Vik K | 10-30-1983 | Yes | Group | 139348484 | Connected | Yes | US | 363-33-3333 |
| Kartik R | 9-29-1981 | Yes | SVP | 4984747 | Idle | Yes | CA | 243-44-3432 |
| Steve Z | 11-1-1972 | No | Account | 847363 | Connected | No | UK | 56-97-9388 |
| | | | | | | | | |
| | | | | | | | | |
| | | | | | | | | |
| | | | | | | | | |

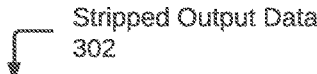

Stripped Output Data
302

| Name | Decision Maker | Job Title | ContactId | Status | Influencer | Country |
|------|----------------|-----------|-----------|--------|------------|---------|
| Vik K | Yes | Group | 139348484 | Connected | Yes | US |
| Kartik R | Yes | SVP | 4984747 | Idle | Yes | CA |
| Steve Z | No | Account | 847363 | Connected | No | UK |
| | | | | | | |
| | | | | | | |
| | | | | | | |
| | | | | | | |

FIG. 4

Contact Data
400

| Name | Decision Maker | Job Title | ContactId | Status | Influencer | Country |
|------|---------------|-----------|-----------|--------|------------|---------|
| Vik K | Yes | Group Manager | 139348484 | Connected | Yes | US |
| Kartik R | Yes | SVP | 4984747 | Idle | Yes | CA |
| Steve Z | No | Account Manager | 847363 | Connected | No | UK |
|  |  |  |  |  |  |  |

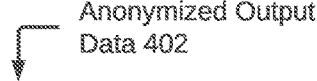

Anonymized Output
Data 402

| Name | Decision Maker | Job Title | ContactId | Status | Influencer | Country |
|------|---------------|-----------|-----------|--------|------------|---------|
| Dkdk dkd | Yes | Group Manager | 139348484 | Connected | Yes | US |
| Kdkdk awee | Yes | SVP | 4984747 | Idle | Yes | CA |
| Uehnd 9hdj | No | Account Manager | 847363 | Connected | No | UK |
|  |  |  |  |  |  |  |

FIG. 5

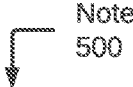

Note
500

Object Name: Service Request Notes
Attribute: Note Text
Attribute Value:
The customer made the payment using Amex credit card number 018493 23400 5738 on date 3/18 which was charged twice. The customer is furious and wants it to be settled as soon as possible. He left his cell number 650 867 0697 for immediate confirmation once resolved.

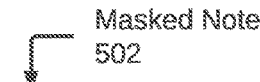

Masked Note
502

Object Name: Service Request Notes
Attribute: Note Text
Attribute Value:
The customer made the payment using Amex credit card number xxxxxx xxxxx xxxx on the date 3/18 which was charged twice. The customer is furious and wants it to be settled as soon as possible. He left his cell number xxx xxx xxxx for immediate confirmation once resolved.

ENTERPRISE DATA AGGREGATION AND COLLECTIVE INSIGHTS GENERATION

TECHNICAL FIELD

The present disclosure relates to customer relationship management (CRM). In particular, the present disclosure relates to generating collective insights based on multiple entities' CRM data.

BACKGROUND

A customer relationship management system, or CRM for short, is a computer-based system that helps entities (e.g., businesses and other organizations) manage customer interactions and data throughout the customer lifecycle. A typical CRM includes features for storing customer data (e.g., contacts, leads, etc.), tracking customer interactions, and managing customer communication.

The data stored in a CRM tends to be sensitive and may include identifiable information such as email addresses, phone numbers, street addresses, account numbers, social security numbers, etc. Because this information is so sensitive, entities generally refrain from sharing it outside of the enterprise's own computing infrastructure. For example, an enterprise may self-host a CRM and never transmit sensitive CRM data outside of the self-hosted environment. Software-as-a-service (SaaS) based CRMs typically isolate each entity's CRM data from that of all other entities.

In many instances, two or more entities have CRM data that overlaps and/or relates to each other in some way. For example, two or more entities that share a contact (e.g., a service provider) typically will store similar CRM data for that contact. In addition, two or more entities may share one or more key characteristics. For example, two or more entities may operate in the same industry and/or geographic region. However, the isolation between these entities' respective CRM systems precludes the generation of business insights based on collective CRM data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. References to "an" or "one" embodiment in this disclosure are not necessarily to the same embodiment and mean at least one. In the drawings:

FIG. 1 shows a block diagram that illustrates an example of a system in accordance with one or more embodiments;

FIG. 3 illustrates an example of stripping attributes in accordance with one or more embodiments;

FIG. 4 illustrates an example of anonymizing attributes in accordance with one or more embodiments;

FIG. 5 illustrates an example of masking content in accordance with one or more embodiments.

DETAILED DESCRIPTION

Figure 2A:
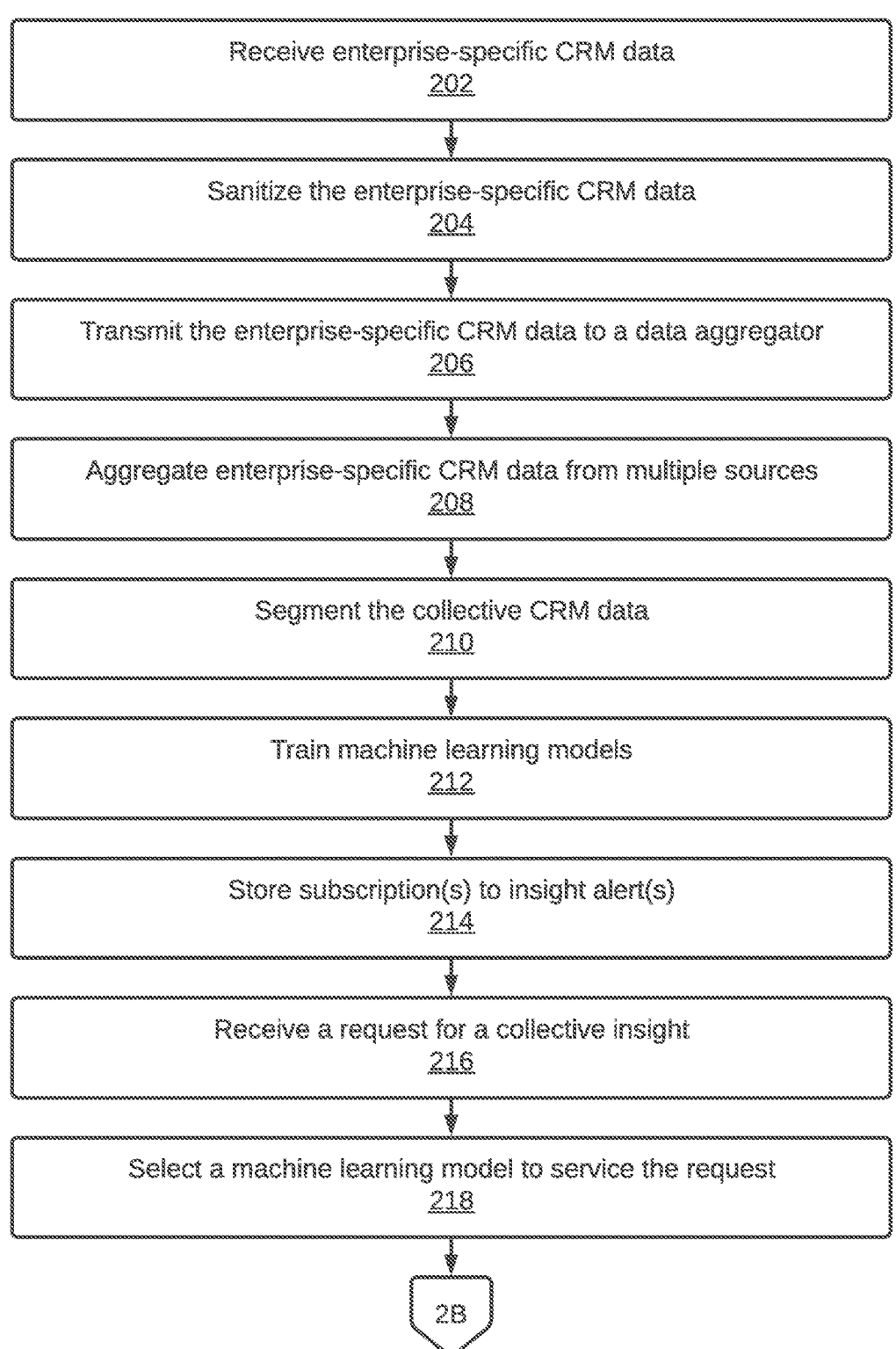
FIGS. 2A-2B illustrate an example set of operations for enterprise data aggregation and collective insights generation in accordance with one or more embodiments.

In the following description, for the purposes of explanation and to provide a thorough understanding, numerous specific details are set forth. One or more embodiments may be practiced without these specific details. Features described in one embodiment may be combined with features described in a different embodiment. In some examples, well-known structures and devices are described with reference to a block diagram form, in order to avoid unnecessarily obscuring the present invention.

The following table of contents is provided for reference purposes only and should not be construed as limiting the scope of one or more embodiments.

1. GENERAL OVERVIEW
2. EXAMPLE SYSTEM
   2.1. SYSTEM COMPONENTS
   2.2. DATA STORAGE
   2.3. USER INTERFACE
   2.4. TENANTS
   2.5. MACHINE LEARNING
3. ENTERPRISE DATA AGGREGATION AND COLLECTIVE INSIGHTS GENERATION
4. COMPUTER NETWORKS AND CLOUD NETWORKS
5. MICROSERVICE APPLICATIONS
   5.1. TRIGGERS
   5.2. ACTIONS
6. HARDWARE OVERVIEW
7. MISCELLANEOUS; EXTENSIONS

1. General Overview

One or more embodiments aggregate CRM data from multiple entities in a manner that protects sensitive data while still allowing for collective insights. The system may store aggregated CRM data in a common data repository, such as a data lake. The system may then use the collective CRM data across participating enterprises to generate deeper business insights than would be possible using only isolated CRM data from a single enterprise.

One or more embodiments use a set of machine learning models to generate collective insights. The system may store multiple machine learning models that are trained to generate insights, respectively, for different industries, geographies, etc. One or more embodiments generate the set of machine learning models by segmenting the collective CRM data according to the relevant factors and training the models based on the respective data segments. Thus, the collective CRM data supports insight generation across multiple dimensions of the collective data, some of which may be overlapping.

One or more embodiments described in this Specification and/or recited in the claims may not be included in this General Overview section.

2. Example System 2.1. System Components

FIG. 1 illustrates an example of a system 100 in accordance with one or more embodiments. As illustrated in FIG. 1, the system 100 includes an interface 102, an insight service 104, and an enterprise-specific CRM 126. The insight service 104 includes a machine learning algorithm 106, training data 108, a target model 110, an insight generator 112, an insight enricher 114, an alert manager 116, and a data repository 118. The data repository 118 includes an inbound data interface 120, a data aggregator 122, and collective CRM data 124. The enterprise-specific CRM 126 includes a data sanitizer 128, an outbound data interface 136, and enterprise-specific CRM data 138. The data sanitizer 128 includes an attribute stripper 130, an attribute anonymizer 132, and a content masker 134.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below in the section titled "Computer Networks and Cloud Networks."

An enterprise-specific CRM 126 is a CRM instance that is specific to a particular enterprise (e.g., a particular business or other organization). The enterprise-specific CRM 126 is configured to store enterprise-specific CRM data 138, i.e., CRM data that is isolated to the enterprise-specific CRM 126. One or more embodiments include multiple enterprise-specific CRMs 126, associated with respective enterprises. Enterprise-specific CRM data 138 for one enterprise may overlap in some way with enterprise-specific CRM data 138 for another enterprise. For example, the two enterprises may share one or more contacts, an industry, a geographical region, etc., even though each enterprise's enterprise-specific CRM data 138 is isolated from the others.

Two different enterprise-specific CRMs 126 may be operated by the same vendor or by different vendors. For example, one or more enterprise-specific CRMs 126 may be self-hosted while one or more other enterprise-specific CRMs 126 may be SaaS-based. In general, the enterprises' respective CRMs 126 may be configured to store enterprise-specific CRM data 138 using one or more of the foundational building blocks of CRMs, such as leads, contacts, accounts, opportunities, and activities.

An enterprise-specific CRM 126 may be configured to raise an event whenever enterprise-specific CRM data 138 is added and/or updated. Responsive to the event, the enterprise-specific CRM 126 may be configured to transmit the new and/or modified data to a data sanitizer 128. In the example illustrated in FIG. 1, the data sanitizer 128 is shown as operating within the enterprise-specific CRM 126. Alternatively or additionally, the insight service 104 (described in further detail below) may include a data sanitizer 128 and an enterprise-specific CRM 126 may be configured to transmit non-sanitized enterprise-specific CRM data 138 to the data sanitizer 128 over a secure connection. If the insight service 104 and enterprise-specific CRM 126 are operated by the same vendor and hosted within the same secure operating environment, the privacy risks associated with these transmissions may be relatively low.

A data sanitizer 128 is configured to sanitize enterprise-specific CRM data 138 in a way that helps obviate the privacy concerns normally associated with pooling CRM data from multiple enterprises. To sanitize enterprise-specific CRM data 138, the data sanitizer 128 may be configured to use an attribute stripper 130, an attribute anonymizer 132, and/or a content masker 134, not necessarily in that order.

An attribute stripper 130 is configured to remove sensitive data such as phone numbers, birth dates, social security numbers, etc. In some embodiments, the specific data to be removed is configurable on an enterprise-specific basis; the administrators of each enterprise-specific CRM 126 may be able to select, on behalf of the respective enterprise, which attributes should be removed. The output of the attribute stripper 130 is a reduced set of the input data in which the sensitive attributes have been removed.

FIG. 3 illustrates an example of stripping attributes in accordance with one or more embodiments. The attribute stripper 130 receives contact data 300 that includes customer names, birth dates, whether the contact is a decision maker in their enterprise, job title, contact identifier, online status, whether the contact is considered an influencer in their field, country, and social security numbers. In this example, the attribute stripper 130 is configured to remove birth dates and social security numbers. Accordingly, the stripped output data 302 produced by the attribute stripper 130 has fewer dimensions than the input contact data 300.

Returning to discussion of FIG. 1, an attribute anonymizer 132 is configured to anonymize personally identifiable attributes and/or other sensitive attributes. Anonymizing attributes preserves the dimensionality of the input data, so that the attribute fields remain available for machine learning, while making sufficient modifications to preserve anonymity. For example, the attribute anonymizer 132 may be configured to replace some or all of the target attributes with random and/or predetermined strings that are not associated with any individual object.

FIG. 4 illustrates an example of anonymizing attributes in accordance with one or more embodiments. The attribute anonymizer 132 receives contact data 400 that includes customer names, whether the contact is a decision maker in their enterprise, job title, contact identifier, online status, whether the contact is considered an influencer in their field, and country. In this example, the attribute anonymizer 132 is configured to anonymize names by replacing them with random string data. Accordingly, the anonymized output data 402 produced by the attribute anonymizer 132 has the same number of dimensions as the input contact data 400.

Returning to discussion of FIG. 1, a content masker 134 is configured to overwrite or "mask" sensitive data in text contents such as notes, email bodies, comments, etc. Such sensitive data may include, for example, credit card numbers, phone numbers, social security numbers, banking details, etc. The content masker 134 does not reduce the dimensionality of the data, and only replaces those portions of text that are identifiable as being sensitive.

FIG. 5 illustrates an example of masking content in accordance with one or more embodiments. The content masker 134 receives a note 500 associated with a customer service request, including the customer's credit card number and phone number. In this example, the content masker 134 is configured to mask the credit card number and phone number with x's, producing a masked note 502 that does not include that sensitive information. The rest of the note remains unmasked, however, so that the remaining information is not lost and may contribute to generating insights.

Returning to discussion of FIG. 1, an outbound data interface 136 of the enterprise-specific CRM 126 is configured to receive enterprise-specific CRM data 138 and transmit it to an inbound data interface 120 of the insight service 104. Together, the outbound data interface 136 and inbound data interface 120 define and enforce the requirements for transferring enterprise-specific CRM data 138 to the insight service 104. Specifically, the outbound data interface 136 may define the format, structure, and protocol of the data to be transmitted, which matches the expected format, structure, and protocol of the data received by the inbound data interface 120. For example, the outbound data interface 136 may only accept data that has passed through the data sanitizer 128 and thus has the expected dimensionality as well as an assurance that the data has been sanitized before transmission. Before transmitting, the outbound data interface 136 may be configured to enhance the enterprise-specific CRM data 138 with an enterprise-specific identifier (e.g., a number and/or other alphanumeric code) that uniquely identifies the enterprise-specific system from which the data originates.

In one or more embodiments, an insight service 104 refers to hardware and/or software configured to perform operations for generating collective insights based on collective CRM data 124, examples of which are described below. The insight service 104 includes a data repository 118, which may be a data lake or another kind of data repository. The data repository 118 is configured to receive sanitized enterprise-specific CRM data 138 via the inbound data interface 120. The insight service 104 is configured to process and generate collective insights based on the received data, as described herein.

In an embodiment, the data repository 118 includes a data aggregator 122. The data aggregator 122 is configured to collect sanitized enterprise-specific CRM data 138 from multiple enterprise-specific CRMs 126 and store the data in a shared location as collective CRM data 124. For example, the data aggregator 122 may store the collective CRM data 124 in one or more shared database table(s) in which each object record includes (a) an enterprise identifier that identifies the source enterprise-specific CRM 126 and (b) a unique identifier that is traceable back to the original record in the enterprise-specific CRM 126.

One or more embodiments may also be configured to store metadata that defines mappings of attributes from the formats used by each source enterprise-specific CRM 126 to a normalized format used by the data repository 118 for the collective CRM data 124. For example, one enterprise-specific CRM 126 may store customer names as a "name" attribute, another enterprise-specific CRM 126 may store customer names as a "CustomerName" attribute, and the collective CRM data 124 may store customer names as a "customer" attribute. The data aggregator 122 may reference the metadata to determine how to map the attributes received from each enterprise-specific CRM 126 to the normalized format.

The following is an example of a set of mappings in accordance with one or more embodiments. In this example, the data aggregator 122 determines which mappings to use based on the unique enterprise identifier ("sourceSystemId") and the type of object received ("objectType"). The attribute names on the right ("objectId", "personName", and "isInfluencer") are the normalized attribute names used to store collective CRM data 124 in this example.

```
{
    "sourceSystemId": "134396",
    "objectType" : "contact",
    "mappings": {
        "contactId" : "objectId",
        "name" : "personName",
        "influencer": "isInfluencer"
        ... .
    }
}
```

This approach may be used similarly for various kinds of CRM objects, such as opportunity, contact, account, etc.

If an enterprise-specific CRM 126 supplies data with attributes for which no mapping has been determined, the unrecognized attribute(s) may be discarded. Alternatively, the data repository 118 may be configured to store the unrecognized attribute(s) until such time as there is a sufficient volume of records with the unrecognized attribute(s) that those records can be used to generate insights. Attributes that are discarded or ignored may be reported back to the enterprise-specific CRM 126. Based on the reporting, representatives from the enterprise and insight service may work together to enhance the data repository 118 (e.g., by supplying new mappings) to support the unused attribute(s). Whether or not to support a particular attribute may be based, in part, on the volume of available records that include that attribute.

In an embodiment, collective CRM data 124, while stored in a common location, is logically segmented according to one or more enterprise characteristics, such as industry, product category, geographical location, etc. For example, the insight service 104 may be configured to segment the collective CRM data 124 by associating one or more corresponding tags with each record. Segments need not be mutually exclusive; a record may belong to a particular geography-based segment while also belonging to a particular industry-based segment, and the two segments are not expected to include all the same records.

In an embodiment, the insight service 104 is configured to use some or all of the collective CRM data 124 as training data 108 for a machine learning algorithm 106, to generate a target model 110. The insight service 104 may be configured to generate multiple target models 110, using different sets of training data 108 and/or different machine learning algorithms 106. For example, if the collective CRM data 124 is logically segmented, the insight service 104 may treat each segment as a different set of training data 108 and generate a corresponding target model 110 for each respective segment. Thus, the insight service 104 may be configured to generate multiple target models 110 that are tailored to generate insights for specific industries, product categories, geographical regions, etc. Alternatively or additionally, the insight service 104 may be configured to generate a target model 110 based on the totality of the collective CRM data 124; however, this approach may produce insights that are less relevant or specific to specific segments. Techniques for machine learning are discussed in further detail below.

In an embodiment, an insight generator 112 is configured to use one or more of the target models 110 to generate collective insights based on the collective CRM data 124. For example, an insight may include a machine learning prediction based on one or more segments of the collective CRM data 124, as determined by the corresponding target model(s) 110. The insight generator 112 may be configured to select, in a given instance, the target model(s) 110 best suited for the insight query at hand. The selection may be based on user input. For example, a user may select a set of object records from the collective CRM data 124 and/or one or more segments of the collective CRM data 124 for which to generate an insight. The selected record(s) and/or segments may be associated with one or more specific target model(s) 110, which the insight generator 112 may then use to generate the requested insight(s).

In an embodiment, an insight enricher 114 is configured to receive insights generated by the insight generator 112, extract metadata to determine which source system(s) originated the record(s) for which the insight(s) was/were generated, and transmit the insight(s) to the source system(s) to enrich the originating enterprise-specific CRM data 138.

As an example, given following sanitized input to the insight service 104:

```
{
    "name" : "dkdk dkd",
    "decisionmaker": "Yes",
    "JobTitle" : "Group Manager",
    "contactId" : 139348484,
    "Status": "Connected",
    "influencer" : "yes",
    "country" : "US"
}
``` the insight enricher 114 may transmit the following enriched data to the source enterprise-specific CRM 126:

```
{
    "name" : "dkdk dkd",
    "decisionmaker": "Yes",
    "JobTitle" : "Group Manager",
    "contactId" : 139348484,
    "Status": "Connected",
    "influencer" : "yes",
    "country" : "US",
    "insights" : [
        {
            "buyerAffinity": "will buy within 6 months",
            "confidence" : 0.94
        },
        {
            "buyerAffinity": "will buy within 3 months",
            "confidence" : 0.72
        },{
            "buyerAffinity": "will not buy",
            "confidence" : 0.47
        }
    ]
}
```

Because the record is associated with metadata (not shown), including an enterprise identifier that uniquely identifies the enterprise-specific CRM 126, the insight enricher 114 is able to direct the enriched data to the appropriate source. In addition, the object name and/or other unique record identifier allows the enterprise-specific CRM 126 to match the enriched data to the original, non-sanitized record in the enterprise-specific CRM data 138.

In an embodiment, an alert manager 116 is configured to store one or more insight alert subscriptions, respectively, for one or more enterprise-specific CRMs 126. An insight alert subscription defines one or more criteria for alerting an enterprise-specific CRM 126 of a given collective insight. For example, an insight alert criterion may specific that an alert should be raised when a metric in a collective alert (e.g., a predicted likelihood of a particular sales outcome) differs from a previous insight by a particular amount or percentage. Responsive to determining that in insight alert criterion is satisfied, the alert manager 116 is configured to transmit an alert to the corresponding enterprise-specific CRM 126. The alert may include a message, contents of the collective insight, enriched CRM data, and/or other kinds of information related to the collective insight.

In one or more embodiments, one or more components of the system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

2.2. Data Storage

In one or more embodiments, a data repository 118 is any type of storage unit and/or device (e.g., a file system, database, collection of tables, and/or any other storage mechanism) for storing data. As discussed above, the data repository 118 may be a data lake or other kind of data repository configured to store collective CRM data 124.

The data repository 118 may include multiple different storage units and/or devices. The multiple different storage units and/or devices may or may not be of the same type or located at the same physical site. The data repository 118 may be implemented or executed on the same computing system as the insight service 104 and/or enterprise-specific CRM 126, and/or on a computing system separate from the insight service 104 and/or enterprise-specific CRM 126. The data repository 118 may be communicatively coupled to the insight service 104 and/or enterprise-specific CRM 126 via a direct connection or via a network. Information describing collective CRM data 124 may be implemented across any of the components of the system 100. However, this information is illustrated within the data repository 118 for purposes of clarity and explanation.

2.3. User Interface

In one or more embodiments, an interface 102 refers to hardware and/or software configured to facilitate communications between a user and the insight service 104. The interface 102 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms. Different components of the interface 102 may be specified in different languages. For example, the behavior of user interface elements may be specified in a dynamic programming language, such as JavaScript. The content of user interface elements may be specified in a markup language, such as hypertext markup language (HTML) or XML User Interface Language (XUL). The layout of user interface elements may be specified in a style sheet language, such as Cascading Style Sheets (CSS). Alternatively, the interface 102 may be specified in one or more other languages, such as Java, Python, C, or C++.

2.4. Tenants

In one or more embodiments, a tenant 103 is a corporation, organization, enterprise, or other entity that accesses a shared computing resource, such as the insight service 104. The system 100 may include multiple tenants 103 that are independent from each other, such that a business or operation of one tenant is separate from a business or operation of another tenant. Some examples of multi-tenant architectures in accordance with one or more embodiments are described in further detail below.

2.5. Machine Learning

In one or more embodiments, a machine learning algorithm 106 is an algorithm that can be iterated to learn a target model 110 that best maps a set of input variables to one or more output variables, using a set of training data 108. The training data 108 includes datasets and associated labels. The datasets are associated with input variables for the target model 110. The associated labels are associated with the output variable(s) of the target model 110. For example, a label associated with a dataset in the training data 108 may indicate a sales outcome that may be the subject of a future insight request. The training data 108 may be updated based on, for example, feedback on the accuracy of the current target model 110. Updated training data may be fed back into the machine learning algorithm 106, which may in turn update the target model 110.

The machine learning algorithm 106 may generate the target model 110 such that the target model 110 best fits the datasets of the training data 108 to the labels of the training data 108. Specifically, the machine learning algorithm 106 may generate the target model 110 such that when the target model 110 is applied to the datasets of the training data 108, a maximum number of results determined by the target model 110 match the labels of the training data 108. Different target models be generated based on different machine learning algorithms and/or different sets of training data.

The machine learning algorithm 106 may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

3. Enterprise Data Aggregation and Collective Insights Generation

Figure 2B:
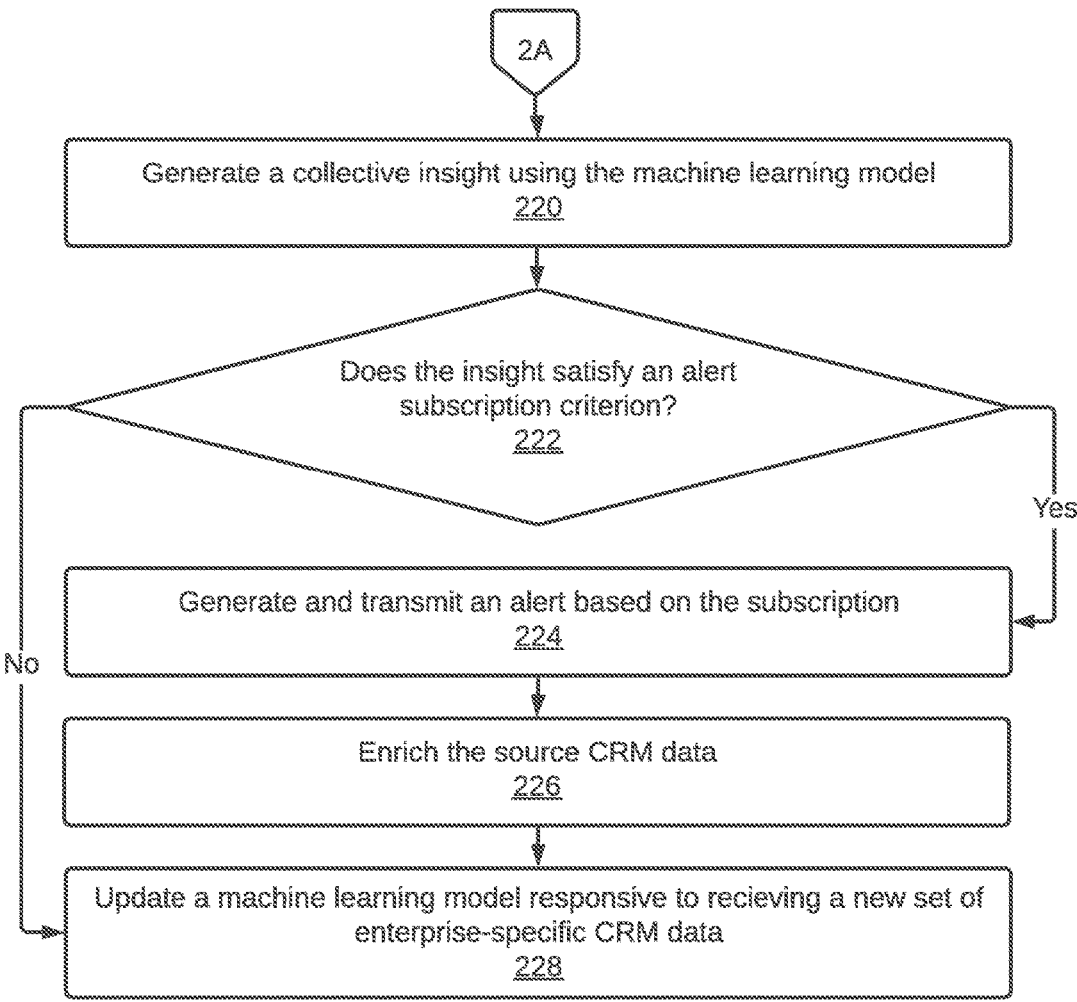

FIGS. 2A-2B illustrate an example set of operations for enterprise data aggregation and collective insights generation in accordance with one or more embodiments. One or more operations illustrated in FIGS. 2A-2B may be modified, rearranged, or omitted all together. Accordingly, the particular sequence of operations illustrated in FIGS. 2A-2B should not be construed as limiting the scope of one or more embodiments.

In an embodiment, the system receives enterprise-specific CRM data (Operation 202). The system may sanitize the enterprise-specific CRM data (Operation 204) using one or more of attribute stripping, attribute anonymization, or content masking. The system transmits the (optionally sanitized) enterprise-specific CRM data to a data aggregator (Operation 206). As discussed above, the system may enrich the enterprise-specific CRM data with a unique enterprise identifier, to allow for tracing back to the source enterprise-specific CRM. The system aggregates enterprise-specific CRM data from multiple enterprise-specific CRMs (Operation 208), to obtain collective CRM data. As discussed above, aggregating enterprise-specific CRM data may use metadata that maps enterprise-specific attributes to normalized attributes used for collective storage.

In an embodiment, the system segments the collective CRM data (Operation 210), for example, using tags and/or other segmentation indicators. The system may train multiple machine learning models (Operation 212) to generate collective insights, respectively, for each of the segments. Some examples of techniques for training a machine learning model are discussed in further detail above. The system may store one or more subscriptions to insight alerts (Operation 214). A subscription may be associated with a particular enterprise-specific CRM, and one or more alert criteria may be associated with collective insight outcomes for a particular CRM data segment.

In an embodiment, the system receives a request for a collective insight (Operation 216). The request may correspond to a trigger condition in a recurring insight generation schedule (e.g., once per week, month, quarter, etc.). Alternatively or additionally, the request may be a one-off request based on user input to the system. Based on the request (e.g., based on the contents of the request itself and/or metadata associated with a recurring request), the system selects a particular machine learning model to service the request (Operation 218). For example, the request may be for a collective insight applicable to a particular segment of the collective CRM data, and that segment may be associated with a particular machine learning model.

In some embodiments, the system also supports enterprise-specific insight requests (not shown). For example, an enterprise that participates in the insight service may request an insight that is specific to that particular enterprise but draws on machine learning knowledge gleaned from the collective CRM data. Operations described herein for generating collective insights may also be used to generate an enterprise-specific insight responsive to such a request.

The system uses the selected machine learning model to generate a collective insight (Operation 220). For example, the system may apply the machine learning model to one or more records in the particular CRM data segment. The machine learning model generates a collective insight which may include, for example, a prediction relating to a particular sales-related outcome (e.g., predicted likelihood of closing a deal, conversion rate, click-through rate for a marketing campaign, etc.).

In an embodiment, the system determines whether the collective insight satisfies an alert subscription criterion (Operation 222). If the insight does satisfy an alert subscription criterion, the system may generate and transmit an alert to a particular enterprise-specific CRM, based on the subscription (Operation 224). The alert may include enriched CRM data, so that the enterprise-specific CRM can enrich the source CRM data accordingly (Operation 226). Some examples of techniques for enriching CRM data are described in further detail above.

In an embodiment, the system detects when a new set of enterprise-specific CRM data is provided. For example, a new enterprise may enroll in the insight service and/or an existing member enterprise may provide a new set of CRM data. Responsive to receiving the new set of enterprise-specific CRM data, the system may update any machine learning model(s) that apply to the relevant CRM data segment(s) (Operation 228).

4. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service, such as execution of a particular application and/or storage of a particular amount of data). A server process responds by, for example, executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, or a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network, such as a physical network. Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

A client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (for example, a web browser), a program interface, or an application programming interface (API).

In one or more embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In one or more embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

A computer network may implement various deployment, including but not limited to a private cloud, a public cloud, and/or a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof may be accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In one or more embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In a multi-tenant computer network, tenant isolation may be implemented to ensure that the applications and/or data of different tenants are not shared with each other. Various tenant isolation approaches may be used. Each tenant may be associated with a tenant identifier (ID). Each network resource of the multi-tenant computer network may be tagged with a tenant ID. A tenant may be permitted access to a particular network resource only if the tenant and the particular network resources are associated with the same tenant ID.

For example, each application implemented by the computer network may be tagged with a tenant ID, and tenant may be permitted access to a particular application only if the tenant and the particular application are associated with a same tenant ID. Each data structure and/or dataset stored by the computer network may be tagged with a tenant ID, and tenant may be permitted access to a particular data structure and/or dataset only if the tenant and the particular data structure and/or dataset are associated with a same tenant ID. Each database implemented by the computer network may be tagged with a tenant ID, and tenant may be permitted access to data of a particular database only if the tenant and the particular database are associated with the same tenant ID. Each entry in a database implemented by a multi-tenant computer network may be tagged with a tenant ID, and a tenant may be permitted access to a particular entry only if the tenant and the particular entry are associated with the same tenant ID. However, the database may be shared by multiple tenants.

In one or more embodiments, a subscription list indicates which tenants have authorization to access which network resources. For each network resource, a list of tenant IDs of tenants authorized to access the network resource may be stored. A tenant may be permitted access to a particular network resource only if the tenant ID of the tenant is included in the subscription list corresponding to the particular network resource.

In one or more embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may be transmitted only to other devices within the same tenant overlay network. Encapsulation tunnels may be used to prohibit any transmissions from a source device on a tenant overlay network to devices in other tenant overlay networks. Specifically, packets received from the source device may be encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

5. Microservice Applications

In one or more embodiments, techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally include a single logical executable. With microservice applications, different microservices are independently deployable as separate executables. Microservices may communicate using Hypertext Transfer Protocol (HTTP) messages and/or according to other communication protocols via Application Programming Interface (API) endpoints. Microservices may be managed and updated separately, written in different languages, and executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

Microservices may be connected via a GUI. For example, microservices may be displayed as logical blocks within a window, frame, or other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

5.1. Triggers

The techniques described above may be encapsulated into a microservice, according to one or more embodiments. In other words, a microservice may trigger a notification (into the microservices manager for optional use by other plugged-in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects that a value has crossed a triggering threshold.

A trigger, when satisfied, may output data for consumption by the target microservice. Alternatively or additionally, when satisfied, a trigger may output a binary value indicating that the trigger has been satisfied, and/or may output the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

5.2. Actions

A plugged-in microservice application may expose actions to the microservices manager. The exposed actions may receive, as input, data or an identification of a data object or location of data that causes data to be moved into a data cloud.

The exposed actions may receive, as input, a request to increase or decrease existing alert thresholds. The input may identify existing in-application alert thresholds and whether to increase, decrease, or delete the threshold. The input may request the microservice application to create new in-application alert thresholds. The in-application alerts may trigger alerts to the user while logged into the application or may trigger alerts to the user, using default or user-selected alert mechanisms available within the microservice application itself, rather than through other applications plugged into the microservices manager.

The microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

6. Hardware Overview

In one or more embodiments, techniques described herein are implemented by one or more special-purpose computing devices. The special-purpose computing device(s) may be hard-wired to perform the techniques, and/or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, FPGAs, or NPUs with custom programming to accomplish the techniques. A special-purpose computing device may be desktop computer systems, portable computer systems, handheld devices, networking devices, or any other device that incorporates hard-wired and/or program logic to implement the techniques.

Figure 6:
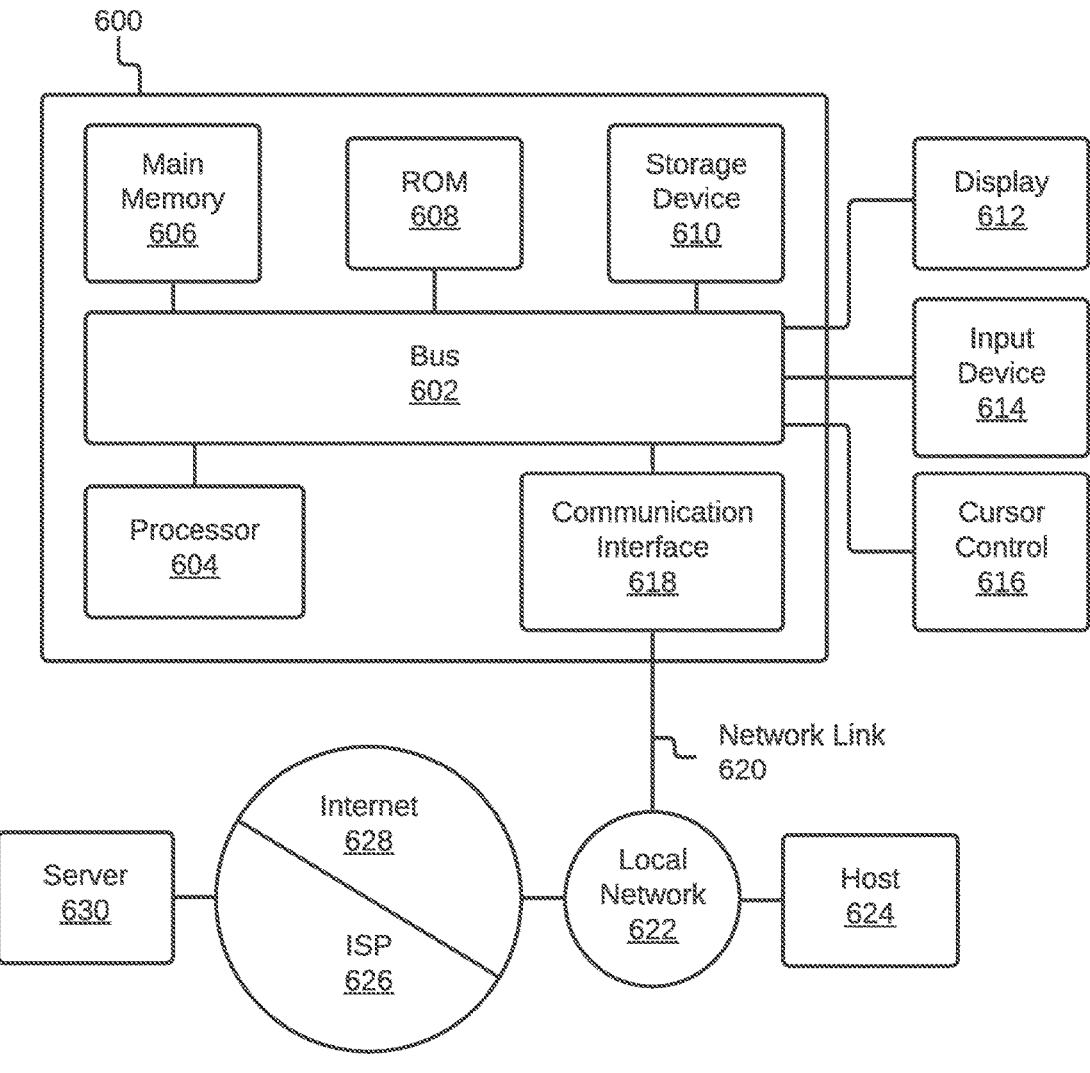
FIG. 6 shows a block diagram that illustrates a computer system in accordance with one or more embodiments.

For example, FIG. 6 is a block diagram that illustrates a computer system 600 upon which one or more embodiments of the invention may be implemented. The computer system 600 includes a bus 602 or other communication mechanism for communicating information, and a hardware processor 604 coupled with bus 602 for processing information. The hardware processor 604 may be, for example, a general-purpose microprocessor.

The computer system 600 also includes a main memory 606, such as a random access memory (RAM) or other dynamic storage device, coupled to bus 602 for storing information and instructions to be executed by processor 604. The main memory 606 also may be used for storing temporary variables or other intermediate information during execution of instructions to be executed by processor 604. Such instructions, when stored in non-transitory storage media accessible to the processor 604, render the computer system 600 into a special-purpose machine that is customized to perform the operations specified in the instructions.

The computer system 600 further includes a read only memory (ROM) 608 or other static storage device coupled to the bus 602 for storing static information and instructions for the processor 604. A storage device 610, such as a magnetic disk or optical disk, is provided and coupled to the bus 602 for storing information and instructions.

The computer system 600 may be coupled via the bus 602 to a display 612, such as a cathode ray tube (CRT), for displaying information to a computer user. An input device 614, including alphanumeric and other keys, is coupled to the bus 602 for communicating information and command selections to the processor 604. Another type of user input device is cursor control 616, such as a mouse, a trackball, or cursor direction keys for communicating direction information and command selections to the processor 604 and for controlling cursor movement on the display 612. This input device typically has two degrees of freedom in two axes, a first axis (e.g., x) and a second axis (e.g., y), that allows the device to specify positions in a plane.

The computer system 600 may implement techniques described herein using customized hard-wired logic, one or more ASICs or FPGAs, firmware, and/or program logic which in combination with the computer system 600 causes or programs the computer system 600 to be a special-purpose machine. In one or more embodiments, the techniques herein are performed by the computer system 600 in response to the processor 604 executing one or more sequences of one or more instructions contained in the main memory 606. Such instructions may be read into the main memory 606 from another storage medium, such as the storage device 610. Execution of the sequences of instructions contained in the main memory 606 causes the processor 604 to perform the process steps described herein. Alternatively, hard-wired circuitry may be used in place of or in combination with software instructions.

The term "storage media" as used herein refers to any non-transitory media that store data and/or instructions that cause a machine to operate in a specific fashion. Such storage media may include non-volatile media and/or volatile media. Non-volatile media includes, for example, optical or magnetic disks, such as storage device 610. Volatile media includes dynamic memory, such as the main memory 606. Common forms of storage media include, for example, a floppy disk, a flexible disk, hard disk, solid state drive, magnetic tape, or any other magnetic data storage medium, a read-only compact disc (CD-ROM), any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires of the bus 602. Transmission media can also take the form of acoustic or light waves, such as those generated during radio frequency (RF) and infrared data communications.

Various forms of media may be involved in carrying one or more sequences of one or more instructions to the processor 604 for execution. For example, the instructions may initially be carried on a magnetic disk or solid-state drive of a remote computer. The remote computer can load the instructions into its dynamic memory and send the instructions over a telephone line or other communications medium, using a modem. A modem local to the computer system 600 can receive the data on the telephone line or other communications medium and use an infrared transmitter to convert the data to an infrared signal. An infrared detector can receive the data carried in the infrared signal and appropriate circuitry can place the data on the bus 602. The bus 602 carries the data to the main memory 606, from which the processor 604 retrieves and executes the instructions. The instructions received by the main memory 606 may optionally be stored on the storage device 610, either before or after execution by processor 604.

The computer system 600 also includes a communication interface 618 coupled to the bus 602. The communication interface 618 provides a two-way data communication coupling to a network link 620 that is connected to a local network 622. For example, the communication interface 618 may be an integrated services digital network (ISDN) card, cable modem, satellite modem, or a modem to provide a data communication connection to a corresponding type of telephone line. As another example, the communication interface 618 may be a local area network (LAN) card configured to provide a data communication connection to a compatible LAN. Wireless links may also be implemented. In any such implementation, the communication interface 618 sends and receives electrical, electromagnetic, or optical signals that carry digital data streams representing various types of information.

The network link 620 typically provides data communication through one or more networks to other data devices. For example, the network link 620 may provide a connection through a local network 622 to a host computer 624 or to data equipment operated by an Internet Service Provider (ISP) 626. The ISP 626 in turn provides data communication services through the world wide packet data communication network now commonly referred to as the "Internet" 628. The local network 622 and Internet 628 both use electrical, electromagnetic, or optical signals that carry digital data streams. The signals through the various networks and the signals on the network link 620 and through the communication interface 618, which carry the digital data to and from the computer system 600, are example forms of transmission media.

The computer system 600 can send messages and receive data, including program code, through the network(s), network link 620, and communication interface 618. In the Internet example, a server 630 might transmit a requested code for an application program through the Internet 628, ISP 626, local network 622, and communication interface 618.

The received code may be executed by processor 604 as it is received, and/or may be stored in the storage device 610 or other non-volatile storage for later execution.

7. Miscellaneous; Extensions

Embodiments are directed to a system with one or more devices that include a hardware processor and that are configured to perform any of the operations described herein and/or recited in any of the claims below.

In one or more embodiments, a non-transitory computer-readable storage medium stores instructions which, when executed by one or more hardware processors, cause performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions that, when executed by one or more processors, cause performance of operations comprising:

sanitizing, by a first enterprise-specific customer relationship management system (CRM), a first set of enterprise-specific CRM data at least by performing one or more of attribute stripping, attribute anonymization, or content masking;

enriching, by the first enterprise-specific CRM, the first set of enterprise-specific CRM data with a first enterprise-specific unique identifier;

transmitting, by the first enterprise-specific CRM, the first set of enterprise-specific CRM data from a first outbound data interface of the first enterprise-specific CRM to an inbound data interface of a shared insight service accessible to a plurality of enterprise-specific CRMs;

wherein the first outbound data interface enforces cross-enterprise data privacy, at least in part, by enforcing a first set of one or more sanitization requirements before transmitting the first enterprise-specific CRM data; and wherein the inbound data interface enforces cross-enterprise data privacy, at least in part, by defining an expected dimensionality for inbound transmissions;

responsive to receiving the first set of enterprise-specific CRM data:

accessing, by the shared insight service based at least in part on the first enterprise-specific unique identifier in the first set of enterprise-specific CRM data, a first mapping from (a) a first data format used by the first enterprise-specific CRM to (b) a normalized data format used by the shared insight service;

mapping, by the shared insight service, the first set of enterprise-specific CRM data to a first set of normalized CRM data according to the first mapping; and storing, by the shared insight service, the first set of normalized CRM data in collective CRM data shared by at least the first enterprise-specific CRM and a second enterprise-specific CRM in the plurality of enterprise-specific CRMs;

sanitizing, by the second enterprise-specific CRM, a second set of enterprise-specific CRM data at least by performing one or more of attribute stripping, attribute anonymization, or content masking;

enriching, by the second enterprise-specific CRM, the second set of enterprise-specific CRM data with a second enterprise-specific unique identifier;

transmitting, by the second enterprise-specific CRM, the second set of enterprise-specific CRM data from a second outbound data interface of the second enterprise-specific CRM to the inbound data interface of the shared insight service;

wherein the second outbound data interface enforces cross-enterprise data privacy, at least in part, by enforcing a second set of one or more sanitization requirements before transmitting the second enterprise-specific CRM data;

responsive to receiving the second set of enterprise-specific CRM data:

mapping, by the shared insight service, the second set of enterprise-specific CRM data to a second set of normalized CRM data;

storing, by the shared insight service, the second set of normalized CRM data in the collective CRM data;

receiving, by the shared insight service, a request to generate a collective insight that is applicable to a particular subset of the collective CRM data, the particular subset of the collective CRM data comprising at least part of the first set of normalized CRM data and at least part of the second set of normalized CRM data;

responsive to the request, selecting a particular machine learning model from a plurality of machine learning models, wherein each machine learning model in the plurality of machine learning models is configured to generate collective insights for a respective subset of the collective CRM data;

generating the collective insight that is applicable to the particular subset of the collective CRM data, using the particular machine learning model.

2. The one or more non-transitory computer-readable media of claim 1, the operations further comprising:

receiving user input comprising one or more user-selected criteria for selecting the particular machine learning model;

wherein selecting the particular machine learning model is performed, at least in part, based on the one or more user-selected criteria.

3. The one or more non-transitory computer-readable media of claim 1, the operations further comprising:

training the particular machine-learning model to generate collective insights for the particular subset of the collective CRM data.

4. The one or more non-transitory computer-readable media of claim 1, the operations further comprising:

receiving an additional set of enterprise-specific CRM data;

aggregating the additional set of enterprise-specific CRM data with the collective CRM data, to obtain updated collective CRM data;

updating the particular machine learning model based on the updated collective CRM data.

5. The one or more non-transitory computer-readable media of claim 1, the operations further comprising:

generating an enterprise-specific insight based on the collective CRM data, using one or more machine learning models in the plurality of machine learning models.

6. The one or more non-transitory computer-readable media of claim 1, the operations further comprising:

determining that the collective insight satisfies an alert subscription criterion associated with a particular enterprise-specific CRM;

responsive top determining that the collective insight satisfies the alert subscription criterion, transmitting an insight alert to the particular enterprise-specific CRM.

7. A system comprising:

one or more hardware processors;

one or more non-transitory computer-readable media; and program instructions stored on the one or more non-transitory computer-readable media which, when executed by the one or more hardware processors, cause the system to perform operations comprising:

sanitizing, by a first enterprise-specific customer relationship management system (CRM), a first set of enterprise-specific CRM data at least by performing one or more of attribute stripping, attribute anonymization, or content masking;

enriching, by the first enterprise-specific CRM, the first set of enterprise-specific CRM data with a first enterprise-specific unique identifier;

transmitting, by the first enterprise-specific CRM, the first set of enterprise-specific CRM data from a first outbound data interface of the first enterprise-specific CRM to an inbound data interface of a shared insight service accessible to a plurality of enterprise-specific CRMs;

wherein the first outbound data interface enforces cross-enterprise data privacy, at least in part, by enforcing a first set of one or more sanitization requirements before transmitting the first enterprise-specific CRM data; and wherein the inbound data interface enforces cross-enterprise data privacy, at least in part, by defining an expected dimensionality for inbound transmissions;

responsive to receiving the first set of enterprise-specific CRM data:

accessing, by the shared insight service based at least in part on the first enterprise-specific unique identifier in the first set of enterprise-specific CRM data, a first mapping from (a) a first data format used by the first enterprise-specific CRM to (b) a normalized data format used by the shared insight service;

mapping, by the shared insight service, the first set of enterprise-specific CRM data to a first set of normalized CRM data according to the first mapping; and storing, by the shared insight service, the first set of normalized CRM data in collective CRM data shared by at least the first enterprise-specific CRM and a second enterprise-specific CRM in the plurality of enterprise-specific CRMs;

sanitizing, by the second enterprise-specific CRM, a second set of enterprise-specific CRM data at least by performing one or more of attribute stripping, attribute anonymization, or content masking;

enriching, by the second enterprise-specific CRM, the second set of enterprise-specific CRM data with a second enterprise-specific unique identifier;

transmitting, by the second enterprise-specific CRM, the second set of enterprise-specific CRM data from a second outbound data interface of the second enterprise-specific CRM to the inbound data interface of the shared insight service;

wherein the second outbound data interface enforces cross-enterprise data privacy, at least in part, by enforcing a second set of one or more sanitization requirements before transmitting the second enterprise-specific CRM data;

responsive to receiving the second set of enterprise-specific CRM data:

mapping, by the shared insight service, the second set of enterprise-specific CRM data to a second set of normalized CRM data;

storing, by the shared insight service, the second set of normalized CRM data in the collective CRM data;

receiving, by the shared insight service, a request to generate a collective insight that is applicable to a particular subset of the collective CRM data, the particular subset of the collective CRM data comprising at least part of the first set of normalized CRM data and at least part of the second set of normalized CRM data;

responsive to the request, selecting a particular machine learning model from a plurality of machine learning models, wherein each machine learning model in the plurality of machine learning models is configured to generate collective insights for a respective subset of the collective CRM data;

generating the collective insight that is applicable to the particular subset of the collective CRM data, using the particular machine learning model.

8. The system of claim 7, the operations further comprising:

receiving user input comprising one or more user-selected criteria for selecting the particular machine learning model;

wherein selecting the particular machine learning model is performed, at least in part, based on the one or more user-selected criteria.

9. The system of claim 7, the operations further comprising:

training the particular machine-learning model to generate collective insights for the particular subset of the collective CRM data.

10. The system of claim 7, the operations further comprising:

receiving an additional set of enterprise-specific CRM data;

aggregating the additional set of enterprise-specific CRM data with the collective CRM data, to obtain updated collective CRM data;

updating the particular machine learning model based on the updated collective CRM data.

11. The system of claim 7, the operations further comprising:

generating an enterprise-specific insight based on the collective CRM data, using one or more machine learning models in the plurality of machine learning models.

12. The system of claim 7, the operations further comprising:

determining that the collective insight satisfies an alert subscription criterion associated with a particular enterprise-specific CRM;

responsive top determining that the collective insight satisfies the alert subscription criterion, transmitting an insight alert to the particular enterprise-specific CRM.

13. A method comprising:

sanitizing, by a first enterprise-specific customer relationship management system (CRM), a first set of enterprise-specific CRM data at least by performing one or more of attribute stripping, attribute anonymization, or content masking;

enriching, by the first enterprise-specific CRM, the first set of enterprise-specific CRM data with a first enterprise-specific unique identifier;

transmitting, by the first enterprise-specific CRM, the first set of enterprise-specific CRM data from a first outbound data interface of the first enterprise-specific CRM to an inbound data interface of a shared insight service accessible to a plurality of enterprise-specific CRMs;

wherein the first outbound data interface enforces cross-enterprise data privacy, at least in part, by enforcing a first set of one or more sanitization requirements before transmitting the first enterprise-specific CRM data; and wherein the inbound data interface enforces cross-enterprise data privacy, at least in part, by defining an expected dimensionality for inbound transmissions;

responsive to receiving the first set of enterprise-specific CRM data:

accessing, by the shared insight service based at least in part on the first enterprise-specific unique identifier in the first set of enterprise-specific CRM data, a first mapping from (a) a first data format used by the first enterprise-specific CRM to (b) a normalized data format used by the shared insight service;

mapping, by the shared insight service, the first set of enterprise-specific CRM data to a first set of normalized CRM data according to the first mapping; and storing, by the shared insight service, the first set of normalized CRM data in collective CRM data shared by at least the first enterprise-specific CRM and a second enterprise-specific CRM in the plurality of enterprise-specific CRMs;

sanitizing, by the second enterprise-specific CRM, a second set of enterprise-specific CRM data at least by performing one or more of attribute stripping, attribute anonymization, or content masking;

enriching, by the second enterprise-specific CRM, the second set of enterprise-specific CRM data with a second enterprise-specific unique identifier;

transmitting, by the second enterprise-specific CRM, the second set of enterprise-specific CRM data from a second outbound data interface of the second enterprise-specific CRM to the inbound data interface of the shared insight service;

wherein the second outbound data interface enforces cross-enterprise data privacy, at least in part, by enforcing a second set of one or more sanitization requirements before transmitting the second enterprise-specific CRM data;

responsive to receiving the second set of enterprise-specific CRM data:

mapping, by the shared insight service, the second set of enterprise-specific CRM data to a second set of normalized CRM data;

storing, by the shared insight service, the second set of normalized CRM data in the collective CRM data;

receiving, by the shared insight service, a request to generate a collective insight that is applicable to a particular subset of the collective CRM data, the particular subset of the collective CRM data comprising at least part of the first set of normalized CRM data and at least part of the second set of normalized CRM data;

responsive to the request, selecting a particular machine learning model from a plurality of machine learning models, wherein each machine learning model in the plurality of machine learning models is configured to generate collective insights for a respective subset of the collective CRM data;

generating the collective insight that is applicable to the particular subset of the collective CRM data, using the particular machine learning model;

wherein the method is performed by at least device comprising one or more hardware processors.

14. The method of claim 13, further comprising:

receiving user input comprising one or more user-selected criteria for selecting the particular machine learning model;

wherein selecting the particular machine learning model is performed, at least in part, based on the one or more user-selected criteria.

15. The method of claim 13, further comprising:

training the particular machine-learning model to generate collective insights for the particular subset of the collective CRM data;

receiving an additional set of enterprise-specific CRM data;

aggregating the additional set of enterprise-specific CRM data with the collective CRM data, to obtain updated collective CRM data;

updating the particular machine learning model based on the updated collective CRM data.

16. The method of claim 13, further comprising:

generating an enterprise-specific insight based on the collective CRM data, using one or more machine learning models in the plurality of machine learning models.

17. The method of claim 13, further comprising:

determining that the collective insight satisfies an alert subscription criterion associated with a particular enterprise-specific CRM;

responsive top determining that the collective insight satisfies the alert subscription criterion, transmitting an insight alert to the particular enterprise-specific CRM.

18. The one or more non-transitory computer-readable media of claim 1, the operations further comprising:

determining, by the shared insight service, that the particular subset of the collective CRM data comprises the first set of enterprise-specific CRM data provided by the first enterprise-specific CRM and the second set of enterprise-specific CRM data provided by the second enterprise-specific CRM;

enriching, by the shared insight service, the first set of enterprise-specific CRM data with data associated with the collective insight;

transmitting, by the shared insight service, the enriched first set of enterprise-specific CRM data to the first enterprise-specific CRM;

enriching, by the shared insight service, the second set of enterprise-specific CRM data with the data associated with the collective insight;

transmitting, by the shared insight service, the enriched second set of enterprise-specific CRM data to the second enterprise-specific CRM.

\* \* \* \* \*